(12) United States Patent
Shiraishi

(10) Patent No.: US 8,180,924 B2
(45) Date of Patent: May 15, 2012

(54) INFORMATION PROCESSING APPARATUS, INFORMATION PROCESSING METHOD AND PROGRAM FOR THE SAME

(75) Inventor: Iwao Shiraishi, Ebina (JP)

(73) Assignee: Konica Minolta Business Technologies, Inc. (JP)

( * ) Notice: Subject to any disclaimer, the term of this patent is extended or adjusted under 35 U.S.C. 154(b) by 369 days.

(21) Appl. No.: 12/069,454

(22) Filed: Feb. 11, 2008

(65) Prior Publication Data

US 2008/0253667 A1 Oct. 16, 2008

(30) Foreign Application Priority Data

Apr. 11, 2007 (JP) ................................. 2007-103523

(51) Int. Cl.
*G06F 15/16* (2006.01)
(52) U.S. Cl. ...... 709/250; 709/223; 358/1.13; 358/1.15; 710/8
(58) Field of Classification Search .................. 709/223, 709/250; 358/1.13, 1.15; 710/8
See application file for complete search history.

(56) References Cited

U.S. PATENT DOCUMENTS

| | | | | |
|---|---|---|---|---|
| 6,498,656 | B1* | 12/2002 | Mastie et al. ................. | 358/1.15 |
| 6,600,569 | B1* | 7/2003 | Osada et al. ................. | 358/1.12 |
| 6,606,162 | B1* | 8/2003 | Simpson ....................... | 358/1.15 |
| 7,102,775 | B2* | 9/2006 | Suyehira ....................... | 358/1.15 |
| 7,760,376 | B2* | 7/2010 | Shinchi ........................ | 358/1.15 |
| 2003/0053106 | A1* | 3/2003 | Kuroda et al. ............... | 358/1.13 |
| 2003/0184799 | A1* | 10/2003 | Ferlitsch ....................... | 358/1.15 |
| 2004/0017580 | A1* | 1/2004 | Kuroda ......................... | 358/1.13 |
| 2004/0158654 | A1* | 8/2004 | Shima ............................... | 710/8 |
| 2004/0218201 | A1* | 11/2004 | Lermant et al. .............. | 358/1.13 |
| 2005/0183010 | A1* | 8/2005 | Iwasaki ......................... | 715/517 |
| 2005/0216602 | A1* | 9/2005 | Armstrong et al. ........... | 709/250 |

FOREIGN PATENT DOCUMENTS

| | | |
|---|---|---|
| JP | 8-185377 A | 7/1996 |
| JP | 2002-91734 A | 3/2002 |
| JP | 2004-334287 A | 11/2004 |
| JP | 2005-101722 A | 4/2005 |
| JP | 2007-316906 A | 12/2007 |

OTHER PUBLICATIONS

Japanese "Office Action" dated May 21, 2009 for counterpart Japanese Application No. 2007-103523; together with an Erglish-language translation thereof.

* cited by examiner

*Primary Examiner* — Thomas Dailey
(74) *Attorney, Agent, or Firm* — Cantor Colburn LLP

(57) ABSTRACT

There is described information processing method and apparatus, which make it possible not only to suppress the maldistribution of the loads in the network system, but also to suppress the deterioration of the overall system performance. The apparatus that is capable of communicating with a client terminal device and other information processing apparatuses through a network, includes a communicating section to communicate with the client terminal device and the other information processing apparatuses; a control section to conduct processes of receiving apparatus information sent from the other information processing apparatuses, establishing at least a group of information processing apparatuses to be in charge of an information processing requested by the client terminal device, based on the apparatus information received, creating a list in which the information processing apparatuses included in the group are registered, and transmitting the list to at least the information processing apparatuses registered in the list.

27 Claims, 16 Drawing Sheets

FIG. 4

| CONDITION A | COEFFICIENT |
|---|---|
| CONDITION B | COEFFICIENT |
| CONDITION C | COEFFICIENT |
| • | • |
| • | • |
| MINIMUM POINTS ||

FIG. 5

| CONDITION | COEFFICIENT |
|---|---|
| RESIDUAL CAPACITY OF HDD | 1 |
| CPU CLOCK | 0.5 |
| NETWORK OCCUPATION RATE | -100 |
| BUSY IN PRINTING (y/n) | -100 |
| STANDBY TIME | 0.5 |
| MINIMUM POINTS=150 ||

FIG. 8

| PRINTER C | 1a | * |
|---|---|---|
| PRINTER B | 2a | |
| PRINTER D | 3a | |
| PRINTER A | 1b | |
| PRINTER G | 2b | |
| PRINTER F | 3b | |
| PRINTER H | 1c | |
| PRINTER E | 2c | |
| PRINTER I | 3c | |

FIG. 10

| PRINTER C | 1a | |
|---|---|---|
| PRINTER B | 2a | * |
| PRINTER D | 3a | |
| PRINTER A | 1b | |
| PRINTER G | 2b | |
| PRINTER F | 3b | |
| PRINTER H | 1c | |
| PRINTER E | 2c | |
| PRINTER I | 3c | |

INFORMATION PROCESSING APPARATUS, INFORMATION PROCESSING METHOD AND PROGRAM FOR THE SAME

This application is based on Japanese Patent Application NO. 2007-103523 filed on Apr. 11, 2007, with Japan Patent Office, the entire content of which is hereby incorporated by reference.

BACKGROUND OF THE INVENTION

The present invention relates to an information processing apparatus, an information processing method and a program, and specifically relates to such an information processing apparatus that is capable of communicating with a client terminal device and other information processing apparatuses through a network, an information processing method that employs the information processing apparatus concerned, and a program for controlling the information processing apparatus concerned.

When a pull printing operation is implemented in the system in which a printer sever and a plurality of printers are coupled to each other through the network, for instance, print data created by the client terminal device is transmitted to the printer sever, so that a predetermined printer acquires the print data from the printer sever to implement the printing operation.

In such the network printing system, according as the scale of the system is expanding due to the increase of a number of the printers and the client terminal devices included in the system, burdens for processing data are concentrated onto the printer sever, resulting in an inability of efficient use of the processing capability possessed by the whole system. Further, even if the number of printer severs were increased so as to disperse the burdens within the system, the operating efficiency of the system operation would be getting worse, due to the complexity of the system administrating aspects.

On the other hand, as oppose to the abovementioned the technology, for instance, Tokkai 2004-334287 Japanese Non-Examined Patent Publication) sets forth such a system that has no printer sever, but is configured by coupling a plurality of printers to each other through the network. Further, in the above system, printers located adjacent to each other are grouped and recorded, so that an adjacent printer can be selected by selecting a printer belonging to the same group, when conducting a dispersion printing operation, so as to make an operation for gleaning output results easy.

Even in such the system that has no printer sever as mentioned in the above, there has existed a group leader, serving as a main printer in the system, and this group leader controls other printers coupled to the system concerned. Accordingly, the processing loads have been liable to concentrate onto the group leader, resulting in such a state that the performance of the whole system (printer group) has deteriorated.

SUMMARY OF THE INVENTION

To overcome the abovementioned drawbacks in conventional information processing apparatus and information processing methods, it is one of objects of the present invention to provide information processing method and apparatus, which make it possible not only to suppress the mal-distribution (uneven distribution) of the loads in regard to the information processing operation to be conducted in the network system, but also to suppress the deterioration of the overall system performance.

Accordingly, at least one of the objects of the present invention can be attained by the information processing methods described as follows.

(1) According to an information processing method reflecting an aspect of the present invention, the information processing method that employs an information processing apparatus capable of communicating with a client terminal device and other information processing apparatuses through a network, comprises: receiving apparatus information sent from the other information processing apparatus; establishing a group of information processing apparatuses to be in charge of an information processing requested by the client terminal device, based on the apparatus information received; creating a list in which the information processing apparatuses included in the group are registered; transmitting the list to at least the information processing apparatuses registered in the list; and making an information processing apparatus that receives the list transmitted in the transmitting step conduct the information processing while sharing it with other information processing apparatus included in the group.

(2) According to another aspect of the present invention, in the information processing method recited in item 1, the group is established, based on processing capabilities of the information processing apparatuses.

(3) According to still another aspect of the present invention, in the information processing method recited in item 2, an information processing apparatus, a processing capability of which is equal to or lower than a predetermined capability level, is excluded from the list.

(4) According to still another aspect of the present invention, the information processing method, recited in item 1, further comprises: establishing plural groups, each being equivalent to the group, and a processing order of the plural groups; and creating the list in which both the plural groups and the processing order are registered.

(5) According to still another aspect of the present invention, in the information processing method recited in item 3, the plural groups are established, based on processing capabilities of the information processing apparatuses, in such a manner that differences between processing capabilities of the plural groups are suppressed.

(6) According to still another aspect of the present invention, in the information processing method recited in item 4, a specific information processing apparatus, which accepts a request of the information processing sent from the client terminal device when its own turn in the processing order has come, and notifies the client terminal device of a message that the information processing is to be conducted by sharing it with the information processing apparatuses included in the group to which the specific information processing apparatus belongs, is registered in the list.

(7) According to still another aspect of the present invention, in the information processing method recited in item 6, after accepting the request of the information processing, the specific information processing apparatus updates the list by changing the list so that a next-specific information processing apparatus, included in a next group ranked next to the group in the processing order, accepts the request of the information processing, and transmits an updated list to information processing apparatuses registered in the updated list.

(8) According to still another aspect of the present invention, in the information processing method recited in item 1, the list is recreated under a predetermined condition.

(9) According to yet another aspect of the present invention, in the information processing method recited in item 8, the predetermined condition is such that a final turn in a processing order registered in the list is finalized.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 shows a condition table to be used for creating a list-type token embodied in the present invention;

FIG. 5 shows a concrete example of the condition table shown in FIG. 4;

FIG. 8 shows the list-type token embodied in the present invention;

FIG. 10 shows a table indicating an updated list-type token embodied in the present invention;

DETAILED DESCRIPTION OF THE PREFERRED EMBODIMENT

Figure 1:
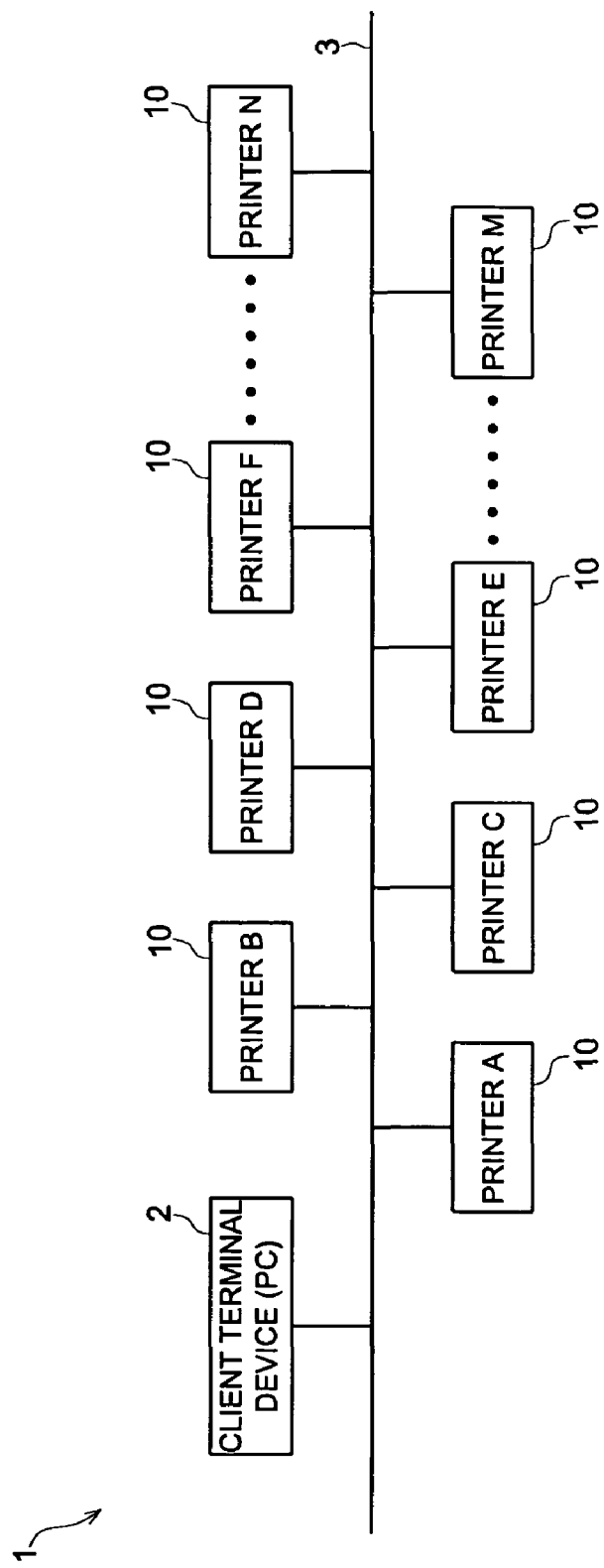
FIG. 1 shows an overall configuration of a printing system including printers embodied in the present invention.

Referring to the drawings, a preferred embodiment of the present invention will be detailed in the following.

FIG. 1 shows an overall configuration of a printing system including printers embodied in the present invention. A printing system 1 is constituted by a plurality of printers 10 (printer A, printer B, printer C, . . . printer N, hereinafter, each of them is referred to as a printer 10), each serving as an information processing apparatus, and a client terminal device 2. The plurality of printers 10 and the client terminal device 2 are coupled to each other through a network 3 so as to make bilateral communications between them possible. The network 3 includes a LAN (Local Area Network) in which computers and networking devices are coupled to each other in conformity with the standard of Token ring, etc., and/or a WAN (Wide Area Network) in which plural LANs are coupled to each other with exclusive lines.

For instance, the client terminal device 2 is, for instance, a personal computer of general purpose, which is provided with a function for creating print data (image data) so as to broadcast a request for submitting a print job into a printer group detailed later, and another function for dividing and encrypting the print data so as to transmits the divided and encrypted print data to the printer group.

Figure 2:
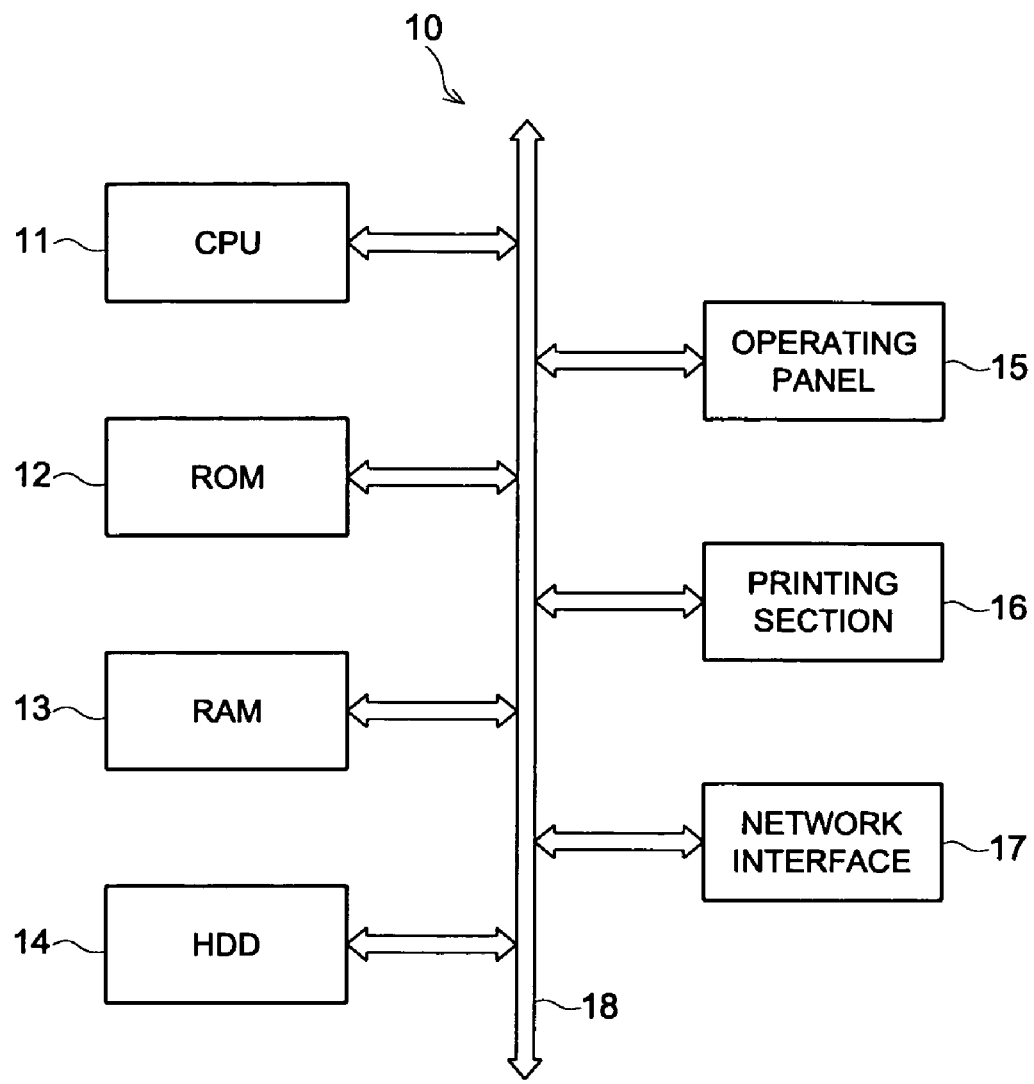
FIG. 2 shows a block diagram indicating a brief configuration of a printer embodied in the present invention.

FIG. 2 shows a block diagram indicating a brief configuration of the printer 10 (printers A through N).

The printer 10 is provided with a function for managing a single print job requested by the client terminal device 2 with the other printer(s) 10 in a decenterized fashion, so as to manage it in a divisive fashion. This data dispersion management function is implemented by a plurality of printer groups (list-type token-ring printer groups), each of which is constituted by a predetermined number of printers 10 selected from the plurality of printers 10 (printers A through N) coupled to the network 3.

In order to perform the data dispersion management function mentioned in the above, the printer 10 is provided with a CPU (Central Processing Unit) 11, a ROM (Read Only Memory) 12, a RAM (Random Access Memory) 13, an HDD (Hard Disc Drive) 14, an operating panel 15, a printing section 16 and a network interface 17, which are coupled to each other through a bus 18 so as to bilaterally exchange signals between them.

The CPU 11 executes various kinds of programs to conduct various kinds of arithmetic calculation processing and controlling operations for the abovementioned sections. The ROM 12 stores in advance the various kinds of programs and various kinds of data therein. The RAM 13 serves as a working area in which currently executed programs and concerned data are temporarily stored. The HDD 14 stores various kinds of programs including the operating system and further stores various kinds of data therein.

The operating panel 15 is employed for displaying various kinds of information and for inputting various kinds of instructions. The printing section 16 conducts a printing operation for printing an image based on image data concerned onto a paper sheet, etc., through an image forming process, based on the electro-photographic method, or the like, including such unit processes of charging, exposing, developing, transferring and fixing. The network interface 17 is, for instance, a LAN card to be employed for communicating with an external device through the network 3.

The printer 10 is also provided with a user authenticating function for authenticating a specific user, based on an ID (Identification) and/or a password inputted from the operating panel 15.

The printer 10 is further provided with functions, to be implemented by the CPU 11 executing predetermined programs, for: receiving apparatus information (processing abilities) from the other printers 10; grouping the printers 10 into plural printer groups, which will share a print processing operation (job) requested from the client terminal device 2 and, at the same time, setting a processing order of the plural printer groups; creating a list (list-type token) in which the plural printer groups and the processing order are registered;

and transmitting the list to each of the printers 10 registered in the list concerned. Still further, the printer 10 is provided with a function for sharing the processing of the print data with other printers 10 belonging to its own group, when its own group should implement the print processing requested from the client terminal device 2.

Next, operations of the printing system 1 including a plurality of printers 10, each of which has the abovementioned configuration and functions, will be detailed in the following. In this connection, in the following explanation, there will be exemplified such the case that, in the printing system 1 (network printing system), embodied in the present invention, in which "N" sets of printers 10 are coupled to each other through the network 3, the "N" sets of printers 10 configure a list-type token-ring printer group and data of a single print job is divided into three data sets within a range of the group concerned, so as to process (store) the three data sets separately.

Figure 3:
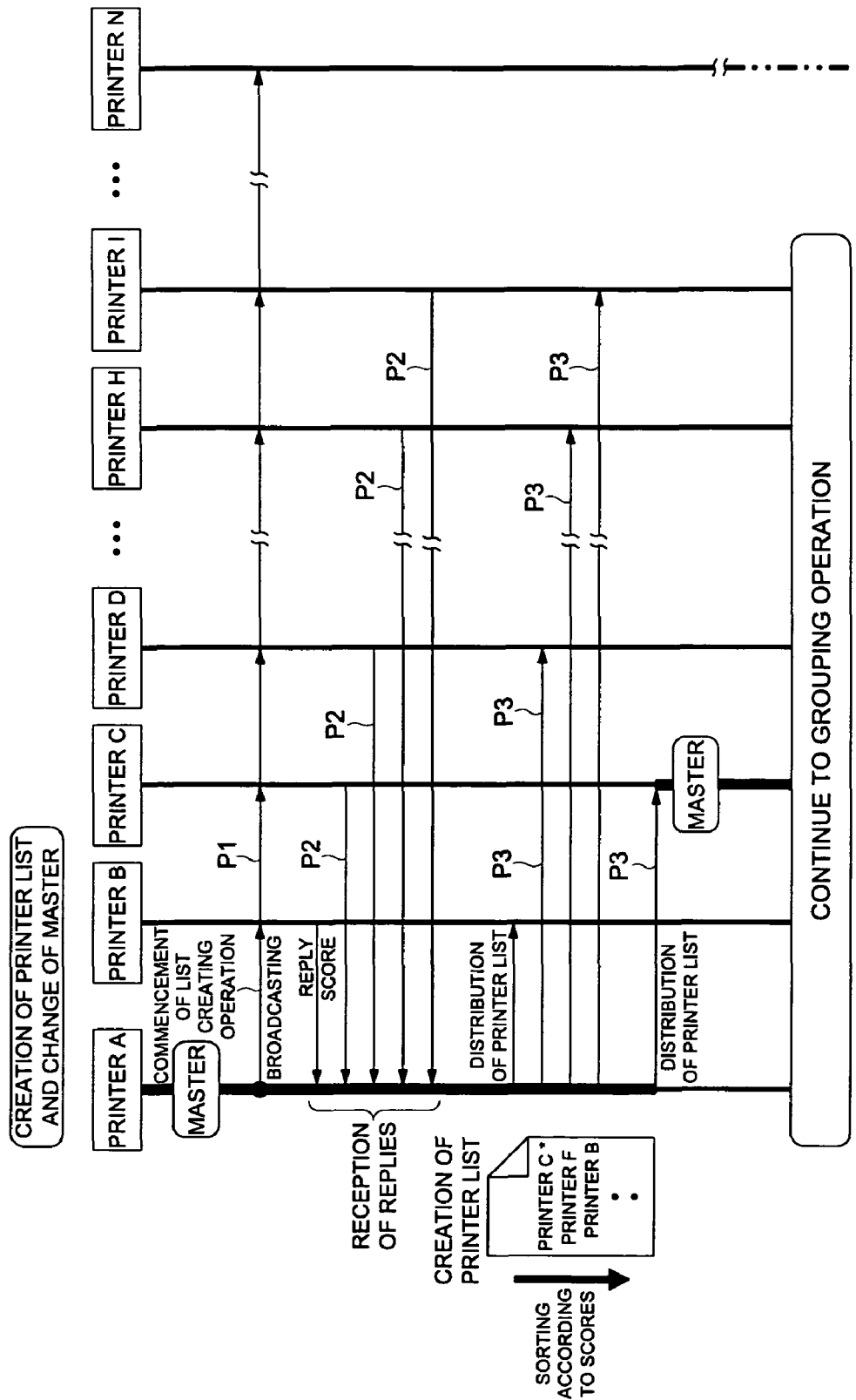
FIG. 3 shows a sequence chart indicating sequential operations for creating an initial list-type token (printer list) and changing a master in a printing system provided with printers embodied in the present invention.

FIG. 3 shows a sequence chart indicating sequential operations for creating an initial list-type token and changing a master in the printing system 1. Further, FIG. 4 shows a condition table to be used for creating the list-type token, and FIG. 5 shows a concrete example of the condition table.

In the present embodiment, in order to create the list-type token for configuring the list-type token-ring printer group, nine sets of printers 10 are selected from the "N" sets of printers 10 and introduced in a list. Hereinafter, the abovementioned printer for creating the list-type token is called a "token master". Further, although the list-type token is created on the basis of the printer list detailed later, it is established in advance so that a specific printer residing on the network implements the initial creating operation of the printer list. Hereinafter, the abovementioned specific printer for initially creating the printer list is called a "tentative master". In the present embodiment, the printer A is established as the tentative master in advance.

As shown in FIG. 3, the printer A, serving as the tentative master, broadcasts a list-creation requesting message to other printers B, C, . . . , N, which are coupled to the network 3 (P1). The condition table is attached to the list-creation requesting message.

As shown in FIG. 4, ability conditions for processing the print job are described in the condition table. Concretely speaking, conditions (conditions A, B, C, . . . ) and coefficients respectively corresponding to the conditions, and a minimum point serving as a reference for determining whether or not a reply should be transmitted to the tentative master, is described in the condition table. As shown in FIG. 5, concrete examples of the lines (condition/coefficient) in the condition table include a "residual capacity of the HDD"/"1", a "CPU clock"/"0.5", a "network occupation rate (port using rate)"/ "−100", a "busy in printing (y/n)"/"−100", a "standby time"/ "0.5", etc. Further, a concrete example of the minimum point is "150", etc.

Each of both the printer A that created the list-creation requesting message and other printers B through N that received the list-creation requesting message, calculates a total points of its own ability by diagnosing the own ability and fitting its ability conditions to the table. For instance, the abovementioned calculation of the total points is conducted by employing the Equation (1) shown in the following, etc.

$$\text{Total points} = \text{"residual capacity of the } HDD\text{"} \times 1 + \\ \text{"}CPU \text{ clock"} \times 0.5 - \text{"port using rate"} \times 100 - \\ \text{"busy in printing } (0/1)\text{"} \times 100 + \text{"standby time"} \times 0.5 \quad (1)$$

Each of the printers A through N calculates the total points in regard to its own ability by employing the Equation (1). If the value of the above-calculated total points is smaller than that of the minimum points, the printer 10 concerned does not transmit a reply to the tentative master. On the other hand, if the value of the above calculated total points is equal to or greater than that of the minimum points, the printer 10 concerned transmits a reply, including a responding message and its total points, to the tentative master. In the example shown in FIG. 3, each of the printers A through I transmits the reply to the tentative master since each of them fulfills the condition (P2), while each of the printers J through N does not transmit the reply to the tentative master since each of them does not fulfill the condition.

Receiving the replies arrived within a predetermined time period from the other printers 10 concerned, the printer A, serving as the tentative master, sorts the arrived replies in order of the total points. In this connection, if the tentative master itself fulfills the condition, the printer A includes its own total points into the arrived replies for the sorting operation, while if not, the printer A excludes its own total points from the arrived replies for the sorting operation. In this example, since the replies have been arrived within the predetermined time period from the other printers B through I, and the printer A, serving as the tentative master, also fulfills the condition, the printer A sorts the replies arrived from printers A through I, including its own reply, in order of the total points.

Figure 6:
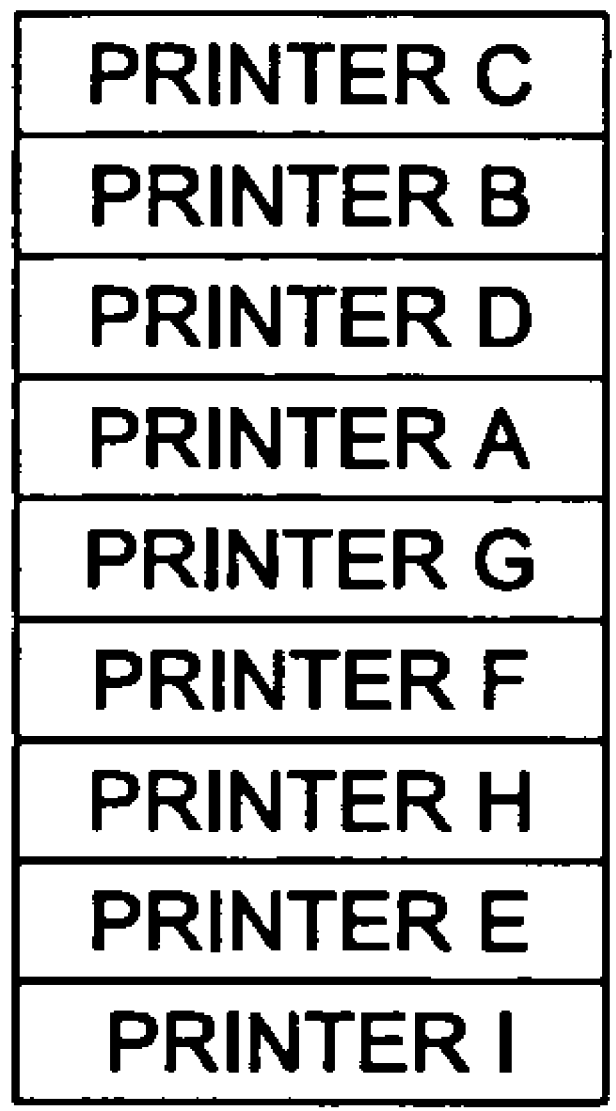
FIG. 6 shows a printer list embodied in the present invention.

FIG. 6 shows a printer list created by sorting the printers A through I in order of the total point in the printer A, serving as the tentative master.

As shown in FIG. 6, the printers A through I are aligned from top to bottom in high-to-low order of the total points. For instance, the printers A through I are aligned from the highest rank (first rank) to the lowest rank (ninth rank) in such a order of the "printer C", the "printer B", the "printer D", the "printer A", the "printer G", the "printer F", the "printer H", the "printer E" and the "printer I", or the like.

As shown in FIG. 3, the printer A, serving as the tentative master, distributes the printer list to the printers B through I, which are registered in the printer list (P3). After distributing the printer list, the master printer is changed to the other printer 10, which is temporarily positioned at the highest rank of the printer list. In the example shown in FIG. 3, the master printer is changed from the printer A to the printer C, and, after that, the printer C serves as the "token master". In this connection, when the tentative master is still positioned at the highest rank of the printer list, the tentative master will serve as the "token master" as it is, without conducting the change of the master printer. Further, it is also applicable that the system is so constituted that, irrespective of the order in the printer list, the tentative master still conducts the operations to be conducted by the token master, detailed in the following, without conducting the change of the master printer.

Figure 7:
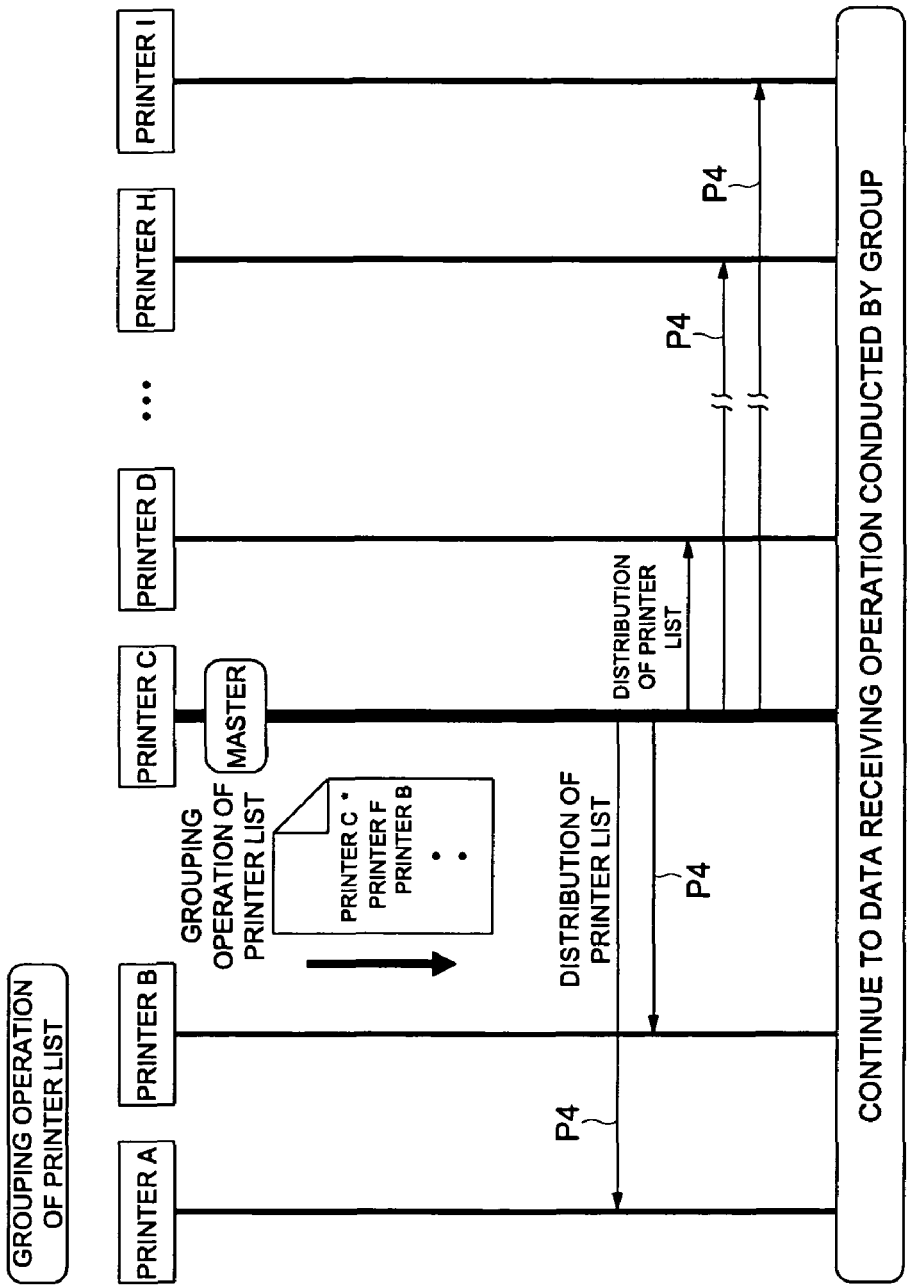
FIG. 7 shows a sequence chart indicating sequential operations for creating a list-type token and distributing a printer list, embodied in the present invention.

FIG. 7 shows a sequence chart indicating sequential operations for creating a list-type token (grouping the printer list) and distributing the printer list, to be conducted by the token master, while FIG. 8 shows the list-type token created by the token master.

The printer C, now serving as the token master, divides the nine sets of printers A through I into three groups, each of which includes three sets of printers selected from the printers A through I. For instance, as shown in FIG. 8, the three printers, positioned every two printers from the upper rank to the lower rank, are grouped as one group, to create the three groups (Grps) from the nine sets of printers listed in the printer list, so that the differences of the processing abilities between the three groups can be equalized as equal as possible.

Concretely speaking, the nine sets of printers are divided into the three groups, including: a group #1 constituted by 1a (printer C positioned at the first rank), 1b (printer A positioned at the forth rank) and 1c (printer H positioned at the seventh rank); a group #2 constituted by 2a (printer B positioned at the second rank), 2b (printer G positioned at the fifth rank) and 2c (printer E positioned at the eighth rank); and a group #3 constituted by 3a (printer D positioned at the third rank), 3b (printer F positioned at the sixth rank) and 3c (printer I positioned at the ninth rank). The group number "#1/#2/#3" of the three groups indicates an order of processing the job requested by the client terminal device 2. In other words, the group number "#1/#2/#3" indicates such a sequence that the job requested by the client terminal device 2 is processed in order of group #1→group #2→group #3. Further, for instance, a current point mark (CP), such as "*", etc., is attached to the printer C registered at the highest rank 1a. Then, the assembly of the list-type token-ring printer groups is completed in the abovementioned.

Successively, the printer C, serving as the token master, distributes the printer list to the other printers 10 (printers A, B, D, through I), registered in the printer list, as the token (list-type token) (P4 shown in FIG. 7).

Figure 9:
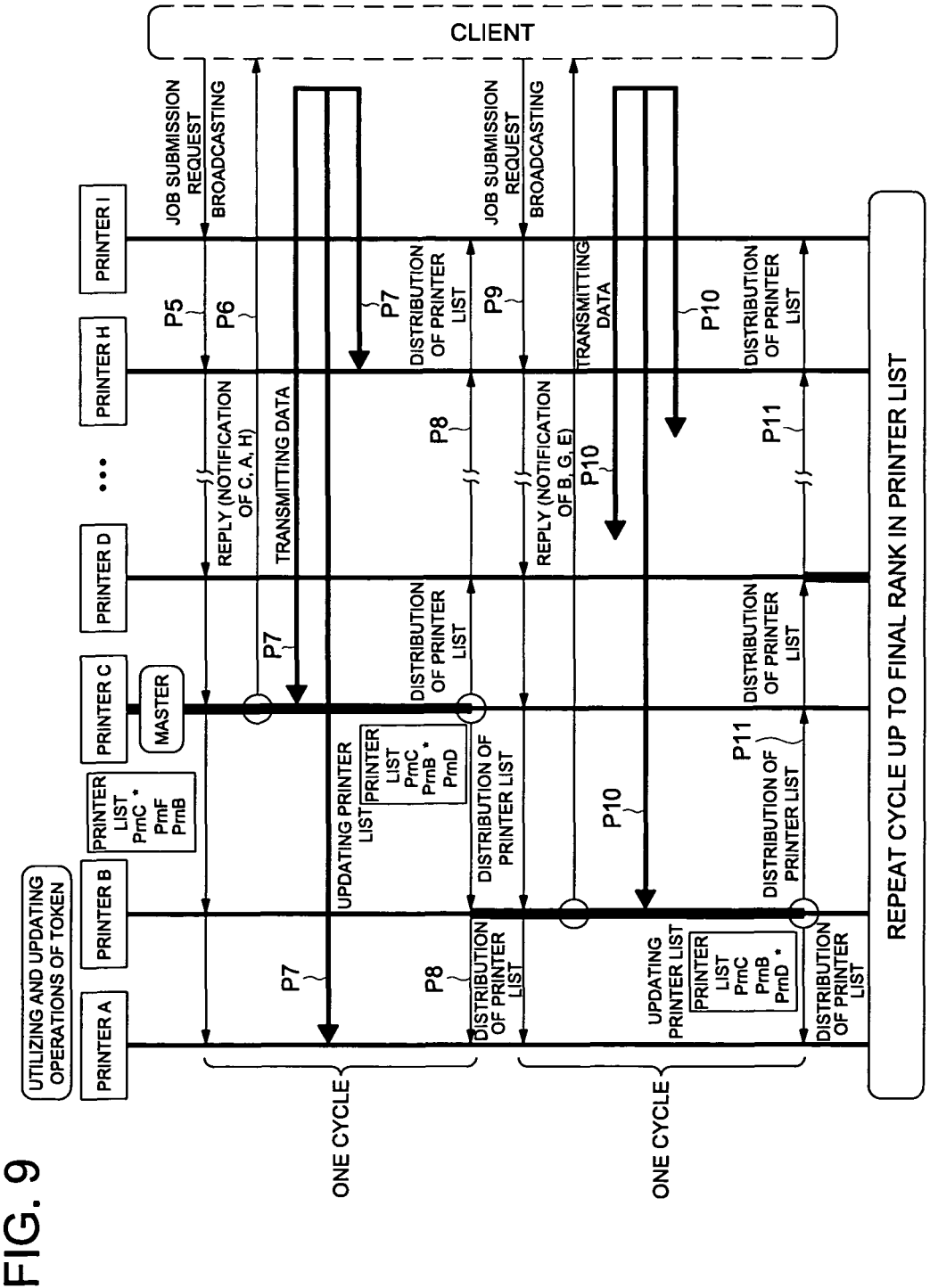
FIG. 9 shows a sequence chart indicating sequential operations for utilizing and updating a list-type token embodied in the present invention.

FIG. 9 shows a sequence chart indicating sequential operations for utilizing and updating the list-type token.

When the user employs the client terminal device 2 (PC) to implement the printing operation, the client terminal device 2 broadcasts a signal representing an intension for submitting a print job (encrypted data) onto the network 3 (job request) (P5).

Receiving the job request currently broadcasted on the network 3, the printer C, attached with the current point mark, immediately couples itself to the client terminal device 2 serving as the sender of the job request, and then, notifies the client terminal device 2 of the information that the printer C itself and the other printers included in the group #1, namely, the printers A and H, process the introduction-requested print job by sharing it with each other (P6).

Receiving the information sent from the printer C, the client terminal device 2 divides the print data into three data sets, and encrypts the three data sets. Then, the encrypted three data sets are transmitted to the printer C, A and H, respectively, so that each of the encrypted three data sets is stored in the HDD 14 of each of the printers concerned (M. Further, the printer C updates the list-type token after receiving (accepting) the job request sent from the client terminal device 2.

FIG. 10 shows a table indicating the updated list-type token. As shown in FIG. 10, the updating operation of the list-type token is achieved by changing the position of the current point mark to that of the other printer positioned next to its own position. In this example, the position of the current point mark is changed to that of the other printer positioned at the second rank on the printer list, namely, the position of the printer B marked by 2a in the group #2. Successively, the printer C distributes the updated list-type token to the other printers (printers A, B, D, through I) registered in the printer list (P8 shown in FIG. 9). In the abovementioned, one sequential processing operation for utilizing and updating the list-type token is completed, and the system is ready for a next receiving operation.

In this connection, although the updating operation of the list-type token is conducted after the encrypted data is stored in the printer C in the sequence chart shown in FIG. 9, in reality, the operation for updating the list-type token is conducted immediately after the printer C receives (accepts) the job request sent from the client terminal device 2. According to this practice, it becomes possible for the next group, which receives the updated printer list in advance, not only to enter the standby state for receiving the print job in an earlier stage, but also to rapidly respond to the request of next print job.

In the next cycle, the printer B conducts the operation same as that conducted by the printer C. According to this operation, print data of the next print job, the submission request of which is issued by the client terminal device 2, are divided and encrypted, and then, the divided-and-encrypted data sets are stored into the HDDs 14 provided in the printer B and the other printers included in the group #2, namely, the printers G and E, respectively, (P10). Further, the printer B changes the current position of the current point mark to the next position of the printer D marked by 3a in the group #3 (third rank on the printer list), so as to update the list-type token to new one in which the current point mark is attached to the printer D. Successively, the printer D distributes the updated list-type token to the other printers (printers A, C, through I) registered in the printer list (P11 shown in FIG. 9). Still successively, the utilization of the list-type token and the updating operation are repeatedly conducted as well.

Figure 11:
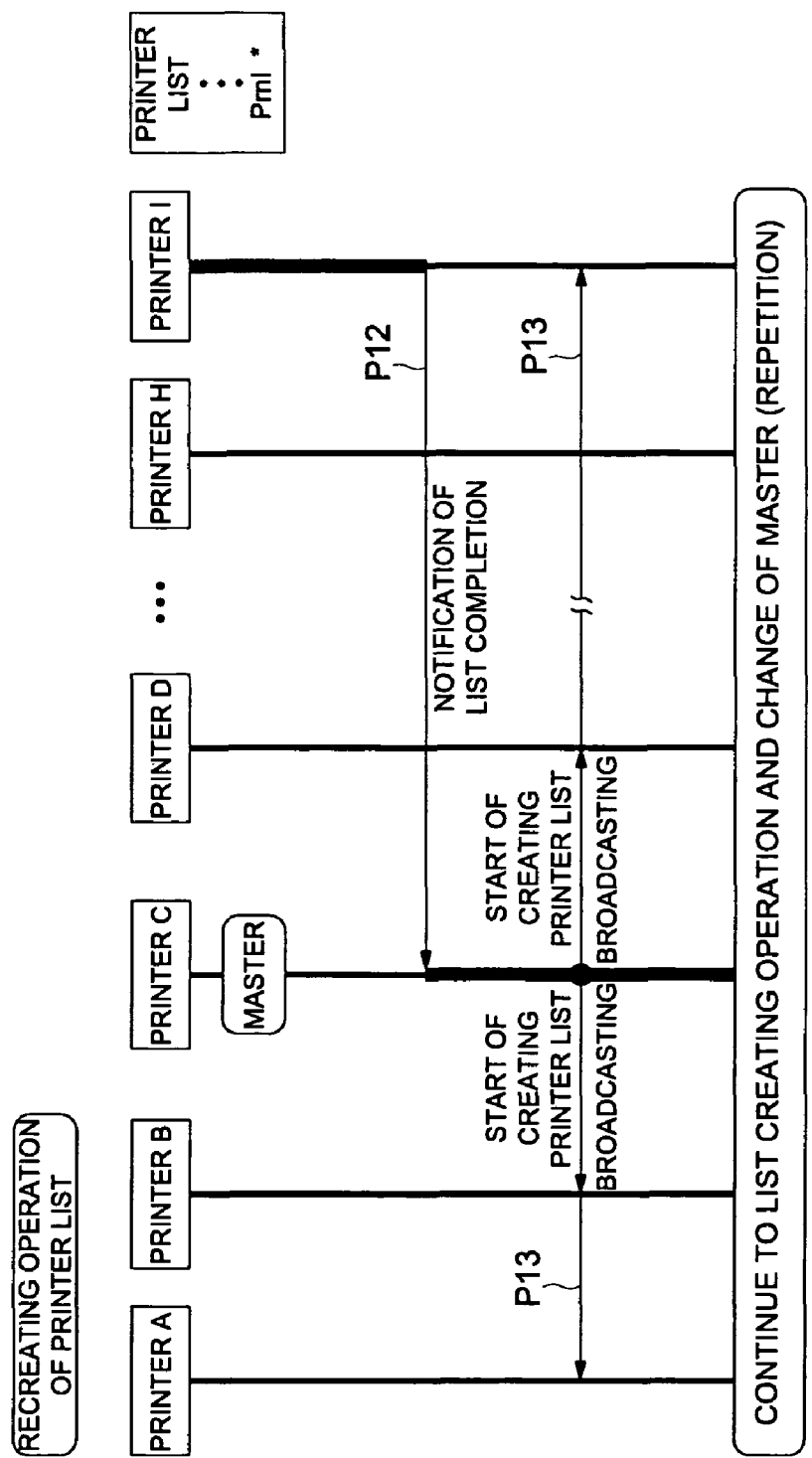
FIG. 11 shows a sequence chart indicating sequential operations for recreating a list-type token embodied in the present invention.

FIG. 11 shows a sequence chart indicating sequential operations for recreating the list-type token.

According as the printers A through I, divided into the three groups, continue the operations for processing the print job submitted by the client terminal device 2, the current point mark of the list-type token finally arrives at the lowest position (printer I) in the printer list. After receiving the submission request of the print job from the client terminal device 2, the printer I, to which the current point mark is finally attached in this list-type token, notifies the token master, positioned at the highest rank within the printer list (namely, the printer C), of the finalization of the list (P12).

In order to recreate the printer list, the printer C, serving as the token master, broadcasts a list-creation requesting message to all of the other printers (printers A, B, D, through N) coupled to the network 3 (P13).

Successively, the printer C conducts the list creating operation and the list distributing operation in the same manner as that initially conducted by the tentative master (namely, the printer A). Accordingly, list-type token-ring printer groups are newly assembled. This operation for reassembling the list-type token-ring printer groups is repeatedly conducted every time when the utilization of one printer list is finalized.

Next, by employing the processing flows viewing from each of the printers 10 and the client terminal device 2, the processing transitions between the printer groups mentioned in the above will be detailed in the following.

Figure 12:
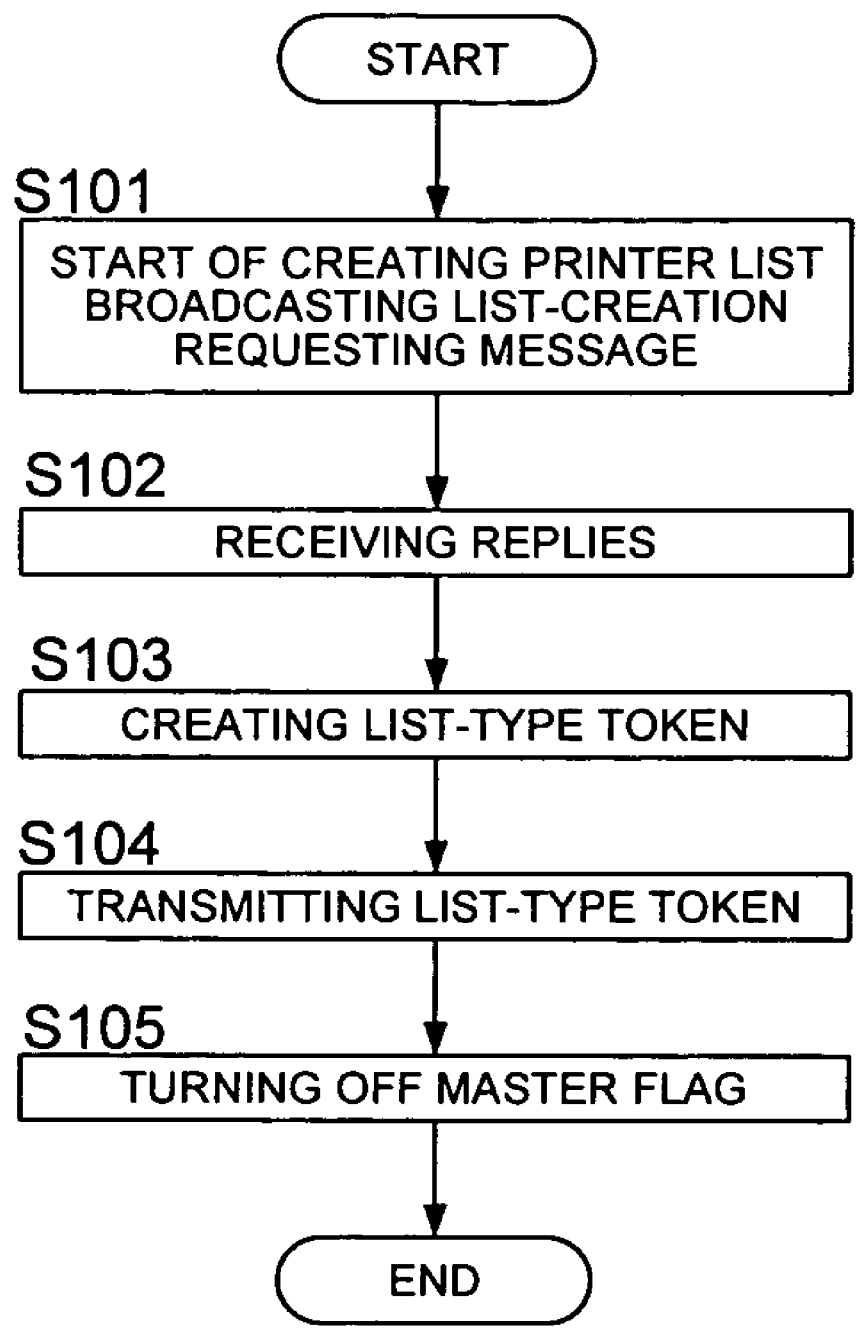
FIG. 12 shows a flowchart indicating an operating flow of a tentative master when initially creating a list-type token in a printing system, or an operating flow of a token master when recreating a list-type token, embodied in the present invention.

FIG. 12 shows a flowchart indicating an operating flow of the tentative master when initially creating the list-type token in the printing system 1, or an operating flow of the token master when recreating the list-type token.

When the tentative master creates the list-type token, or when the token master recreates the list-type token (START), the tentative master or the token master broadcasts the list creation requesting message (condition table) to each of the printers 10 (Step S101).

Receiving the replies sent from the printers 10 in response to the list-creation requesting message (condition table) (Step S102), the tentative master or the token master lists the printers 10 while dividing them into plural groups, so as to create the list-type token (Step S103). The created list-type token is transmitted to the printers 10 registered in the printer list (Step S104). After transmission of the list-type token is completed, the master flag is turned OFF (Step S105), to finalize this operating flow (END).

Figure 13:
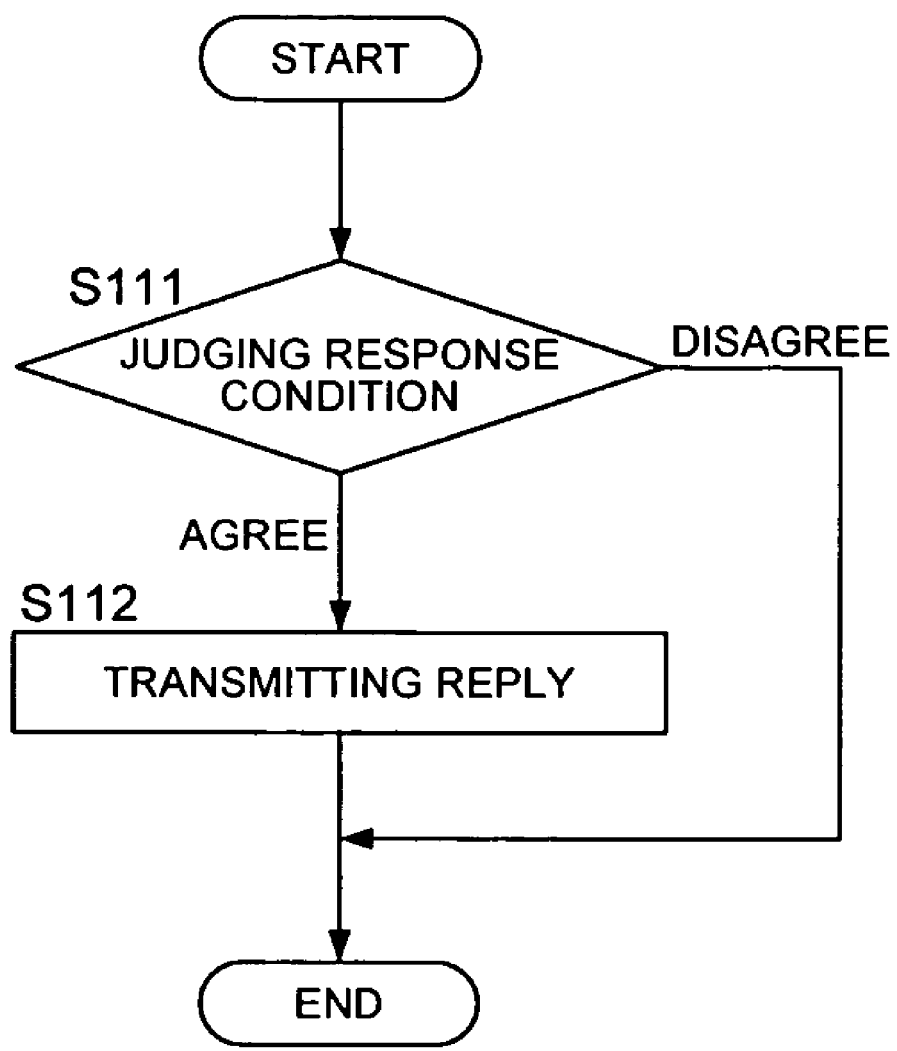
FIG. 13 shows a flowchart indicating an operating flow of each printer, when responding to a list-creation requesting message embodied in the present invention.

FIG. 13 shows a flowchart indicating an operating flow of the printer 10 (each of the printers 10 coupled to the printing system 1) when responding to the list-creation requesting message sent from the tentative master or the token master.

Receiving the list creation requesting message (condition table) broadcasted by the tentative master or the token master (START), the printer 10 conducts a judging operation with respect to the response condition (Step S111). When determining that the contents of the list-creation requesting message agree with the response condition (Step S111; AGREE), the printer 10 transmits a reply to the tentative master or the token master (Step S112), and finalizes this operating flow, so as to enter into the standby state until the concerned printer 10 receives a next list-creation requesting message to be broadcasted later on (END). On the other hand, when determining that the contents of the list-creation requesting message disagree with the response condition (Step S111; DISAGREE), the printer 10 finalizes this operating flow without transmitting a reply to the tentative master or the token master, so as to enter into the standby state until the concerned printer 10 receives a next list-creation requesting message to be broadcasted later on (END).

Figure 14:
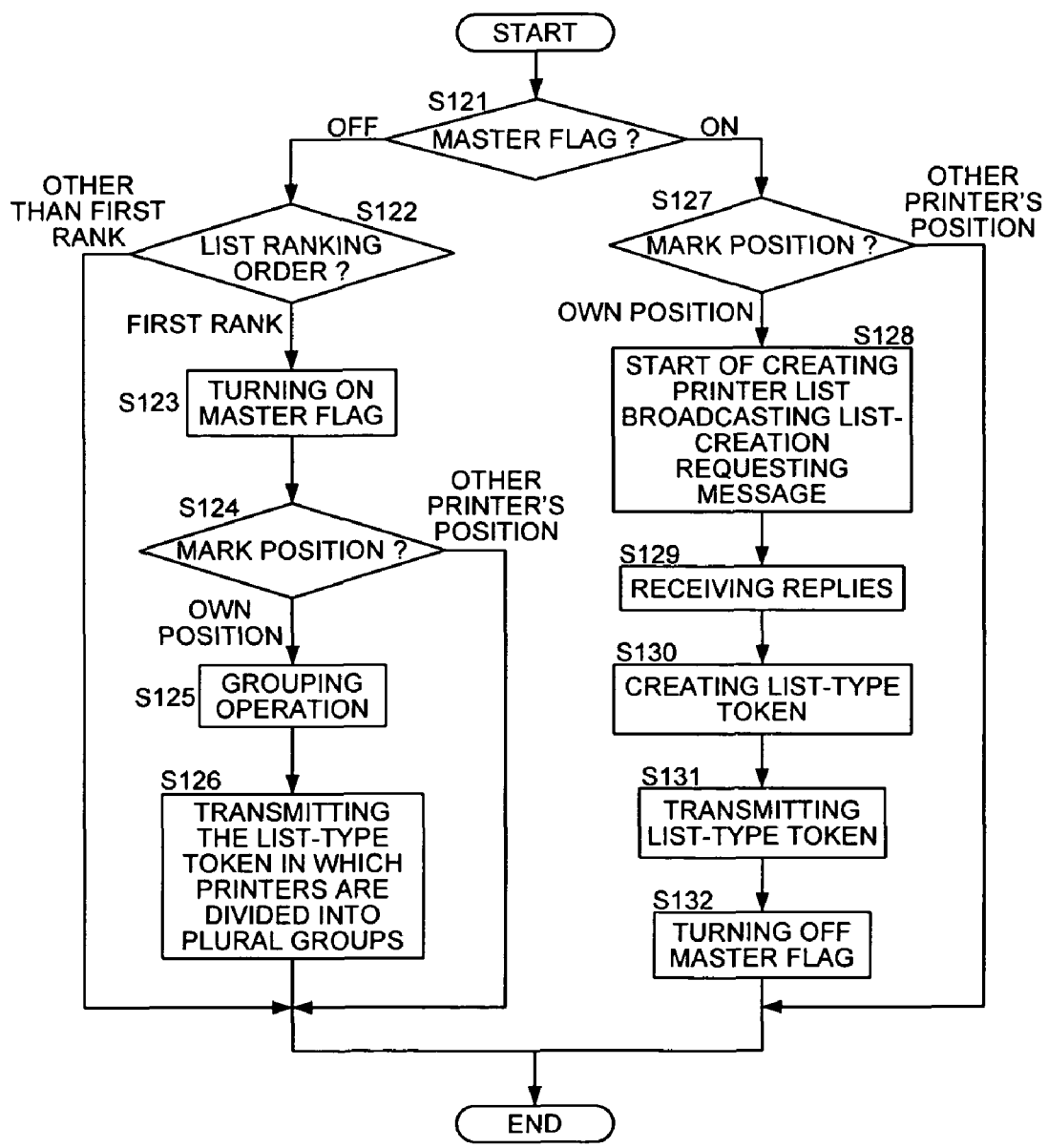
FIG. 14 shows a flowchart indicating an operating flow of each printer, when receiving a list-type token embodied in the present invention.

FIG. 14 shows a flowchart indicating an operating flow of the printer 10 (each of the printers 10 coupled to the printing system 1) when receiving the list-type token Receiving the list-type token (START), the printer 10 conducts a judging operation for determining whether the master flag is turned ON or OFF (Step S121). When determining that the master flag is turned OFF (Step S121; OFF), the printer 10 further conducts a judging operation for determining its own order (list ranking order) registered in the list-type token (Step S122).

When determining that its own order is other than the first rank as a result of the operation for judging the list ranking order (Step S122; OTHER THAN FIRST RANK), the printer 10 finalizes this operating flow, and enters into a standby state until the concerned printer 10 receives a next list-type token (END). When determining that its own order is the first rank (Step S122; FIRST RANK), the printer 10 turns ON the master flag (Step S123), and then, determines the position of the mark (current point mark) registered in the list-type token (Step S124).

When determining that the current point mark is positioned at its own position (Step S124; OWN POSITION), the concerned printer 10 conducts a grouping operation for dividing the printers 10 into plural groups (Step S125). Successively, the concerned printer 10 transmits the list-type token, in which the printers 10 are divided into the plural groups, to the printers 10 registered in the list-type token concerned (Step S126), and then, finalizes this operating flow, to enter into the standby state until the concerned printer 10 receives a next list-type token (END). Further, when determining that the current point mark is positioned at a position of another printer 10 (Step S124; ANOTHER PRINTER), the printer 10 finalizes this operating flow without implementing the grouping operation, and enters into the standby state until the concerned printer 10 receives a next list-type token (END).

On the other hand, when determining that the master flag is turned ON (Step S121; ON), the printer 10 further conducts a judging operation for determining the position of the mark (current point mark) registered in the list-type token (Step S127).

When determining that the current point mark is positioned at its own position (Step S127; OWN POSITION), the concerned printer 10 implements the aforementioned operations for recreating the list-type token, to be conducted by the token master (refer to FIG. 12) (Step S127 through Step S132), and then, finalizes this operating flow, to enter into the standby state until the concerned printer 10 receives a next list-type token (END). Further, when determining that the current point mark is positioned at a position of another printer 10 (Step S127; ANOTHER PRINTER), the printer 10 finalizes this operating flow without implementing the operation for recreating the list-type token, and enters into the standby state until the concerned printer 10 receives a next list-type token (END).

Figure 15:
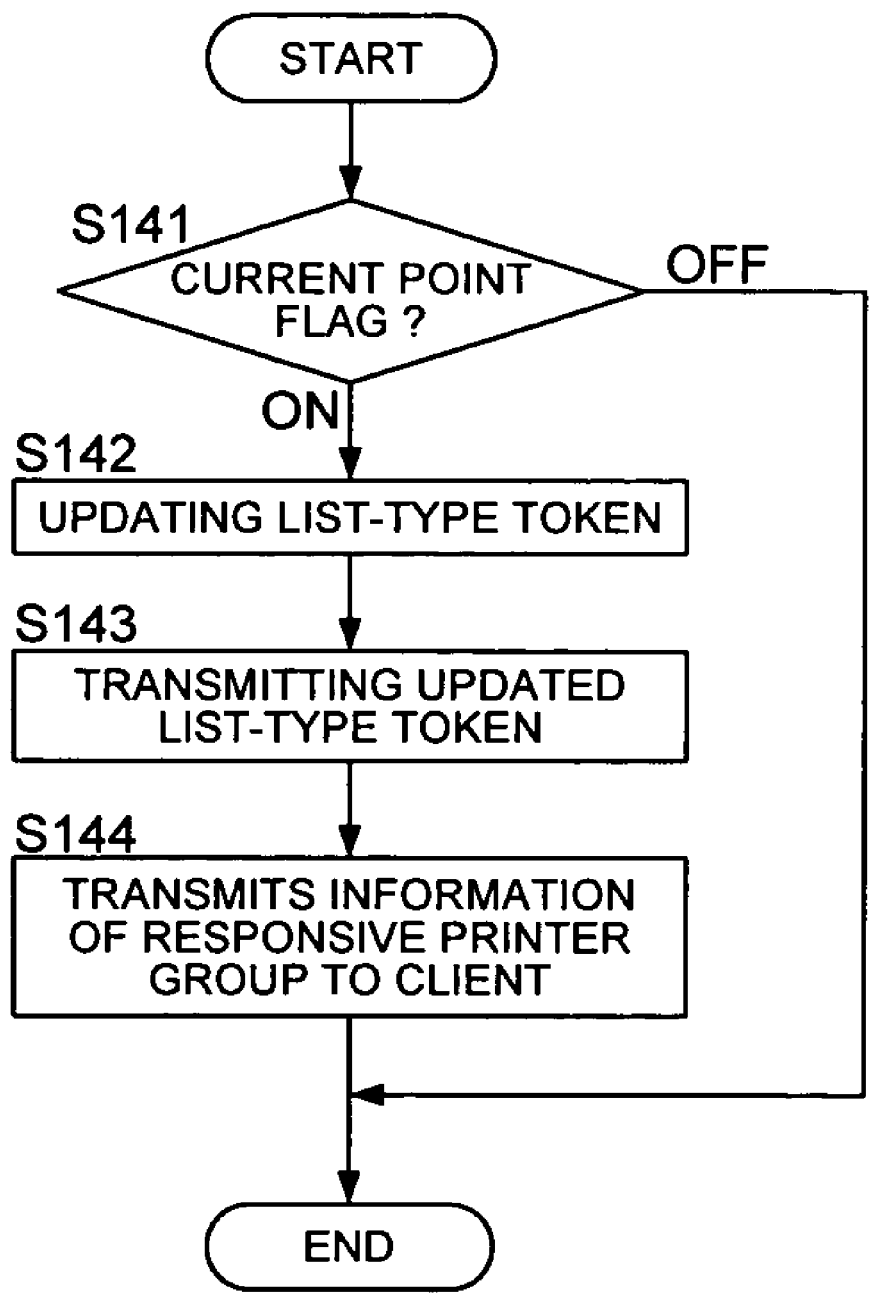
FIG. 15 shows a flowchart indicating an operating flow of a printer, when an introduction request of a print job, embodied in the present invention, is issued.

FIG. 15 shows a flowchart indicating an operating flow of the printer 10 when the submission request of the print job is issued (at the time when receiving the broadcast).

Receiving the submission request of the print job broadcasted by the client terminal device 2 (START), the printer 10 conducts a judging operation for determining whether the current point flag (current point mark) is turned ON or OFF (Step S141). When determining that the current point flag is turned ON (Step S141; ON), the printer 10 conducts an operation for updating the list-type token (Step S142), and transmits the updated list-type token to the printers 10 registered in the printer list (Step S143).

Successively, the concerned printer 10 transmits information of the printer group, being respondent to the print job under the submission request, to the client terminal device 2 (Step S144), and finalizes this operating flow, to enter into the standby state until the concerned printer 10 receives a next introduction request of the print job, which is to be broadcasted later on (END). On the other hand, when determining that the current point flag is turned OFF (Step S141; OFF), the printer 10 finalizes this operating flow without conducting the operation for updating the list-type token, and enters into the standby state until the concerned printer 10 receives a next submission request of the print job, which is to be broadcasted later on (END).

Figure 16:
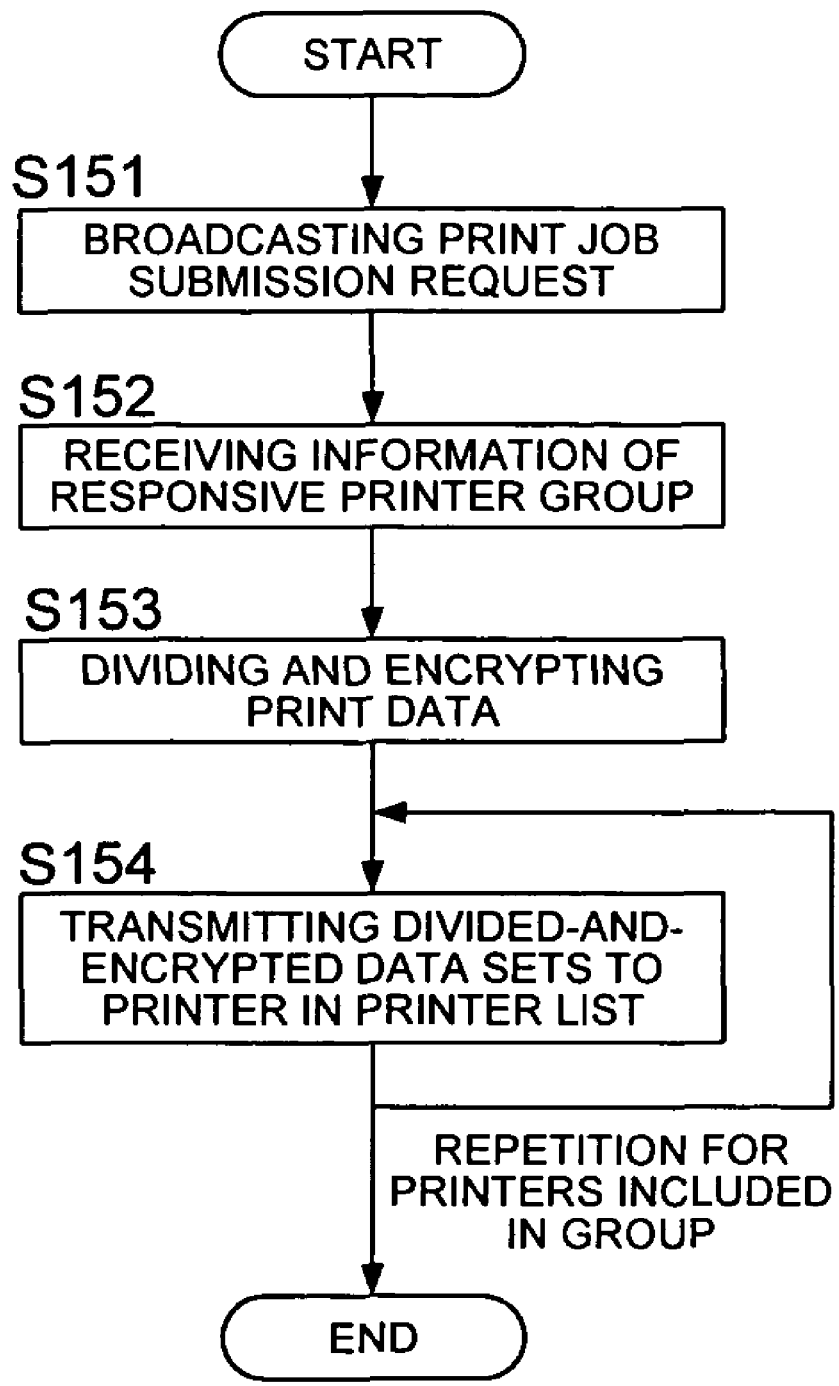
FIG. 16 shows a flowchart indicating an operating flow when introducing a print job embodied in the present invention.

FIG. 16 shows a flowchart indicating an operating flow when submitting the print job.

The client terminal device 2 broadcasts the request of the print job to submit the print job (Step S151). Receiving the information of the printer group being respondent to the print job (Step S152), the client terminal device 2 divides the print data and encrypts the divided data sets (Step S153). The divided-and-encrypted data sets are respectively transmitted to the printers 10 included in the printer group being respondent to the print job (repeating Step S154 same times as the number of printers included in the group concerned), and then, this operating flow is finalized (END).

Figure 17:
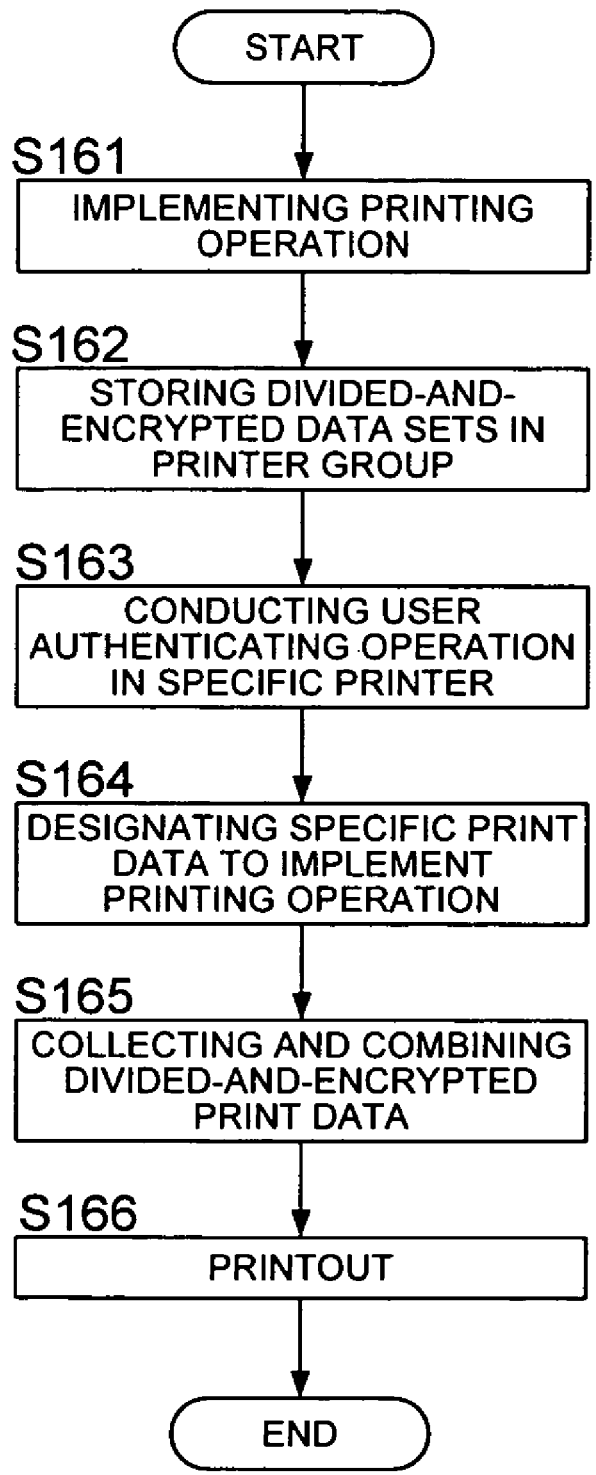
FIG. 17 shows a flowchart indicating an operating flow, when a user employs a printing system, embodied in the present invention, to conduct a pull printing operation.

FIG. 17 shows a flowchart indicating an operating flow when the user employs the printing system 1 to conduct a pull printing operation.

When the user employs the client terminal device 2 to implement the printing operation based on the print data (Step S161), the printers 10, included in the printer group to be in charge of this print job, store the divided-and-encrypted data sets, transmitted from the client terminal device 2, into the HDDs 14 of them, respectively, (Step S162).

The user conducts a user authenticating operation in any one of the printers 10 included in the printing system 1 (Step S163) before implementing the operation for acquiring the printout, and then, designates the specific print data to implement the printing operation (Step S164).

The printer 10, currently used for implementing the printing operation by the user, collects and combines the divided-and-encrypted data sets dispersedly stored in the printers 10 included in the specific printer group (Step S165), so as to output the printout based on the combined print data (Step S166). Succeeding to the abovementioned, the pull printing operation, to be conducted in the printing system 1 by the user, is finalized (END).

As described in the foregoing, in the printing system 1 (network printer system), embodied in the present invention, in which a plurality of printers 10 ("N" sets of printers) are coupled to each other through the network 3, when automatically determining the printer 10 for controlling the print data by dividing it, the processing load does not concentrate onto a specific printer 10. Concretely speaking, since it becomes possible for a certain printer 10, residing within the network and having more spare time than that of other printers 10, to cope with such the controlling operations, and presence or absence of such the spare time is continuously updated at predetermined time intervals by repeating the operation for recreating the printer list, the dispersed state of the processing load can be maintained. Further, since the printer 10 to be in charge of the next print job is determined in advance at a predetermined timing, it becomes possible to immediately cope with the print job at the time when the print job is actually submitted into the system, resulting in an improvement of the response of the system.

Further, each of the three groups (groups #1-#3), each of which is assembled from nine sets of printers 10 (printers A, through I) registered in the printer list (list-type token), implements the print processing operation of the print job requested by the client terminal device 2, by sharing it among the printers 10 included in the group concerned, when the concerned group's turn for processing the print job comes according to the processing order registered in the printer list. According to the abovementioned, it becomes possible not only to suppress (or equalize) the mal-distribution (uneven distribution) of the loads among the plurality of printers 10 provided in the printing system 1 when processing the print job, but also to suppress the deterioration of the overall system performance. In addition, since the print data is handled in the decentralized administration mode (divided storing mode) by the plural printers 10, and the distributed destinations are changed every time when the client terminal device 2 requests the implementation of the print job, it becomes possible to improve the security of the print data concerned. Further, by utilizing the abovementioned printer list, it becomes possible to efficiently conduct the operation for selecting the distributed destinations of the data (divided data storing destinations) without providing any centralized server, etc. Still further, the dispersion of the job processing loads in the printing system 1 and the decentralized administration of the data can be achieved by the simplified method.

Still further, in the present embodiment, by establishing the plural groups to be registered in the printer list so as to suppress the ability differences between the groups, for instance, it becomes possible to prevent such the case that a group having an extremely low processing ability is assembled, resulting in an extreme decrease of the processing velocity. In addition, since the printers 10 (printers J, through N), having processing ability lower than a predetermined level, are not registered in the printer list, while the printers 10 (printers A through I), having high processing ability, are registered prior to the others, it becomes possible to assemble the printer groups having high processing ability.

Still further, since the printer 10, serving as a group leader that accepts the implementation request of the print job sent from the client terminal device 2 and notifies each of printers 10 belonging to its own group to share the processing operation of the print data in regard to the job concerned, is determined in advance by registering it in the printer list (by using the current point mark), it becomes possible to rapidly respond when the print job is actually submitted (rapidly responding possibility), for instance, compared to such the case that any one of the printers 10 included within the group is determined as the printer responsive to the request of the print job, after accepting the request of the print job, or such the case that each of the printers 10 included within the group individually responds to the request. In addition, by changing the printer 10 serving as the abovementioned group leader (by moving the current point mark), it becomes possible to suppress the concentration of the load onto a specific printer 10, for instance, compared to such the case that the printer 10 serving as the abovementioned group leader is fixedly determined in advance.

Still further, when the final turn in the processing order registered in the printer list (third processing operation for group #3/printer I) is finalized, the printer list is recreated, and at the same time, the group organization is also changed. Since occasional states of printers 10 on the network from time to time are reflected onto the abovementioned operation for recreating the printer list, for instance, even if the state or the ability of the individual printer 10 varies depending on the operating status due to the continuation of the job processing, the difference between the data processing amounts, etc., by recreating the printer list at the predetermined time intervals to change the group organization, it is possible to suppress the fluctuation of the processing capability or the deterioration of the processing efficiency of the printer group concerned. Specifically, by recreating the printer list before the processing order is proceeded to its one round and the fluctuation of the processing capability and/or the deterioration of the processing efficiency due to the continuation of the job processing is/are getting large, it becomes possible to maintain the processing capability and efficiency of the printer group at a high level state.

Yet further, by excluding the printer 10, having processing ability equal to or lower than the predetermined level, from the printer list, since changes of members (printers 10) constituting the group occur in accordance with the changes of the processing ability due to the continuation of the job processing, it becomes possible to maintain the processing capability of the printer group at a high level state. In addition, since the random property at the data-dispersing destination is heightened, the security aspect of the data (robustness of encrypted code) is also heightened higher than ever.

Although the embodiment of the present invention has been described in the foregoing while referring to the drawings, the scope of the present invention is not limited to the embodiment described in the foregoing. Modifications and additions of/to the present embodiment, made by a skilled person without departing from the spirit and concept of the present invention, shall be included in the scope of the present invention.

For instance, although the client terminal device 2 and "N" sets of printers 10 are coupled to each other through the network 3 in the printing system 1 described in the foregoing as the embodiment of the present invention, the kinds of devices and the number of devices to be coupled to the network 3 are not limited to the above.

Further, although, in the list creating operation described in the foregoing, the nine sets of printers 10 (printers A, through I), having capabilities higher than those of the others, are selected from the "N" sets of printers 10 coupled to the network 3, and then, the nine sets of printers 10 are divided into the three groups (groups #1 through #3), each of which including the three sets of printers 10, the number of groups and the number of printers 10 to be included in each of the groups are not limited to the above. For instance, it is applicable that the number of printers 10 constituting one group is set at two sets or more than three sets. Further, it is also possible to further heighten the security aspect of the system by increasing the number of printers 10 to be selected in the list creating operation so as to increase the number of data dispersing destinations, and/or by increasing the number of printers 10 constituting one group so as to increase the number of the divided data sets.

Still further, although each of the three groups, included in the single printer list, processes three print jobs for three times so as to conduct the operations for processing the total nine print jobs in the aforementioned embodiment, for instance, it is also applicable that nine kinds of groups (for instance, A/B/C, A/D/E, B/D/E, C/D/E, F/G/H, . . . ) are assembled to process the total nine print jobs.

Still further, with respect to the grouping operation of the printers 10, it is applicable that the printers 10 are divided into the groups according to a combination of a high performance printer and a low performance printer, and another combination of intermediate performance printers. Alternatively, it is also applicable that the grouping operation is conducted in such a manner that the number of high performance printers emerging in the printer list is getting larger than that of low performance printers.

Still further, although, in the aforementioned embodiment, the printer 10 determines whether or not its own group's turn for processing the print job requested by the client terminal device 2 has come, by distributing the printer list in which the position of the current point mark is updated, it is also applicable that the system is so constituted that each of the printers 10 monitors the introduction request of the print job, broadcasted by the client terminal device 2, and counts how many times the submission requests are broadcasted, so as to recognize what group ranked in each of the lists should be in charge of the job request concerned.

Yet further, the aforementioned embodiment of the present invention is applicable not only for the information processing apparatus, such as the printer, etc., which mainly handles the print data, as described in the aforementioned embodiment, but also for another information processing apparatus employed for the RAID (Redundant Arrays of Independent (Inexpensive) Disks), being a technology for realizing the high speed, high capacity and highly reliable storage apparatus by employing a plurality of storage devices (information processing apparatuses), such as an HDD, etc., to disperse the accesses.

According to the aforementioned embodiment of the present invention, it becomes possible not only to suppress the mal-distribution (uneven distribution) of the loads in regard to the information processing operation to be conducted in the network system, but also to suppress the deterioration of the overall system performance.

While the preferred embodiments of the present invention have been described using specific term, such description is for illustrative purpose only, and it is to be understood that changes and variations may be made without departing from the spirit and scope of the appended claims.

What is claimed is:

1. An information processing apparatus capable of communicating with a client terminal device and other information processing apparatuses through a network in order to implement an information processing job requested by the client terminal device, comprising:

a communicating section to communicate with the client terminal device and the other information processing apparatuses; and a control section including a processor and memory;

wherein the control section is adapted to conduct processes of:

initiating a broadcast of a list-creation requesting message, including a condition table, to the other information processing apparatuses, to request that each of the other information processing apparatuses estimate an own ability for implementing the information processing job and return the condition table, including the estimated own ability to the initiating information processing apparatus;

receiving an apparatus information set, which includes the condition table, from each of the other information processing apparatuses;

determining whether the own ability of each of the other information processing apparatuses exceeds a predetermined level, based on the condition table received, so as to select specific information processing apparatuses, the own abilities of which exceed the predetermined level, as those available for implementing the information processing job requested by the client terminal device from both the initiating information processing apparatus and the other information processing apparatuses;

establishing a group of the specific information processing apparatuses among which implementation of the information processing job requested by the client terminal device are to be shared, based on all of apparatus information sets corresponding to both the initiating information processing apparatus and the other information processing apparatuses;

creating a list in which the specific information processing apparatuses included in the group are registered; and transmitting the list to at least the specific information processing apparatuses registered in the list.

2. The information processing apparatus of claim 1 wherein the control section is further adapted to conduct processes of: retaining the list when the initiating information processing apparatus is registered in the list as one of the selected specific information processing apparatuses; and implementing a shared part of the information processing job, requested by the client terminal device, in conjunction with another specific information processing apparatus of the selected specific information processing apparatuses, which implements another shared part of the information processing job, when the selected specific information processing apparatuses registered in the list implement the information processing job as a whole.

3. The information processing apparatus of claim 1, wherein the control section is further adapted to select each of the specific information processing apparatuses to be included in the group, based on an individual processing capability of each of the other information processing apparatuses and the initiating information processing apparatus.

4. The information processing apparatus of claim 3, wherein an information processing apparatus, a processing capability of which is equal to or lower than a predetermined capability level, is excluded from the list.

5. The information processing apparatus of claim 1, wherein the control section is further adapted to conduct processes of: establishing plural groups, the ability differences between the groups being suppressed; establishing a processing order of the plural groups; and creating the list in which both the plural groups and the processing order are registered.

6. The information processing apparatus of claim 5, wherein the control section is further adapted to establish the plural groups, based on an individual processing capability of each of the other information processing apparatuses and the initiating information processing apparatus, in such a manner that differences between intensive processing capabilities of the plural groups are suppressed.

7. The information processing apparatus of claim 5, wherein the control section is further adapted to register one of the specific information processing apparatuses into the list as a host information processing apparatus, which accepts the information processing job requested by the client terminal device when the group takes a turn at implementing the information processing job in the processing order of the plural groups, and notifies the client terminal device of a message that the information processing job is to be conducted by sharing the information processing job among the specific information processing apparatuses included in the group in which the host information processing apparatus is included.

8. The information processing apparatus of claim 7, wherein, after accepting the request of the information processing job, the host information processing apparatus updates the list by changing the list so that a next-host information processing apparatus, included in a next group ranked next to the group in the processing order, accepts the request of the information processing job, and transmits an updated list to information processing apparatuses registered in the updated list.

9. The information processing apparatus of claim 1, wherein the list is recreated under a predetermined condition.

10. The information processing apparatus of claim 9, wherein the predetermined condition is such that a final turn in a processing order registered in the list is finalized.

11. The information processing apparatus of claim 1, wherein estimating an own ability includes evaluating a residual capacity of a memory of the information processing apparatus, a CPU clock of the information processing apparatus, a network occupation rate of the information processing apparatus, a standby time of the information processing apparatus and whether the information processing apparatus is busy in printing.

12. The information processing apparatus of claim 1, wherein the condition table includes information regarding a residual capacity of a memory of the information processing apparatus, CPU clock of the information processing apparatus, network occupation rate of the information processing apparatus, printing status of the information processing apparatus, and standby time of the information processing apparatus.

13. An information processing apparatus capable of communicating with a client terminal device and other information processing apparatuses through a network in order to implement an information processing job requested by the client terminal device, comprising:
 a communicating section to communicate with the client terminal device and the other information processing apparatuses; and
 a control section including a processor and memory;
 wherein the control section is adapted to conduct processes of:
  receiving a list-creation requesting message, including a condition table, from a requesting one of the other information processing apparatuses;
  estimating an own ability for implementing the information processing job;
  sending the condition table, modified to include the estimated own ability, to the requesting one of the other information processing apparatuses;
  receiving and retaining a list in which a group of specific information processing apparatuses, among which implementation of the information processing job requested by the client terminal device are to be shared, are registered, and which is sent from the requesting one of the other information processing apparatuses when the requesting one of the other information processing apparatuses selects the receiving information processing apparatus as one of the group of specific information processing apparatuses;
 available for implementing the information processing job, requested by the client terminal device, from both the receiving information processing apparatus and the other information processing apparatuses, based on the own ability of the receiving information processing apparatus included in the condition table; and
 wherein the control section is adapted to implement a shared part of the information processing job in conjunction with another specific information processing apparatus, which implements another shared part of the information processing job, when the group of the selected specific information processing apparatuses registered in the list implement the information processing job as a whole.

14. The information processing apparatus of claim 13, wherein each of the specific information processing apparatuses to be included in the group is selected, based on an individual processing capability of each of the other information processing apparatuses and the receiving information processing apparatus.

15. The information processing apparatus of claim 14, wherein an information processing apparatus, a processing capability of which is equal to or lower than a predetermined capability level, is excluded from the list.

16. The information processing apparatus of claim 13, wherein plural groups, the ability differences between the groups being suppressed, and a processing order of the plural groups are registered in the list; and
 wherein the control section is adapted to implement a shared part of the information processing job in conjunction with another specific information processing apparatus, which implements another shared part of the information processing job, when the group of the selected specific information processing apparatuses registered in the list implement the information processing job as a whole.

17. The information processing apparatus of claim 13, wherein the list is recreated under a predetermined condition.

18. The information processing apparatus of claim 16, wherein the list is recreated under a predetermined condition; and
 wherein the predetermined condition is such that a final turn in the processing order registered in the list is finalized.

19. An information processing method that employs an information processing apparatus capable of communicating with a client terminal device and other information processing apparatuses through a network in order to implement an information processing job requested by the client terminal device, comprising:

initiating a broadcast of a list-creation requesting message, including a condition table, to the other information processing apparatuses, to request that each of the other information processing apparatuses estimates an own ability for implementing the information processing job and return the condition table, including the estimated own ability, to the initiating information processing apparatus;

receiving an apparatus information set, which includes the condition table, from each of the other information processing apparatuses;

determining whether the own ability of each of the other information processing apparatuses exceeds a predetermined level, based on the condition table received, so as to select specific information processing apparatuses, the own abilities of which exceed the predetermined level, as those available for implementing the information processing job requested by the client terminal device from both the initiating information processing apparatus and the other information processing apparatuses;

establishing a group of the specific information processing apparatuses among which implementation of the information processing job requested by the client terminal device are to be shared, based on all of apparatus information sets corresponding to both the initiating information processing apparatus and the other information processing apparatuses;

creating a list in which the specific information processing apparatuses included in the group are registered;

transmitting the list to at least the specific information processing apparatuses registered in the list; and making the information processing apparatus implement a shared part of the information processing job in conjunction with another specific information processing apparatus, which implements another shared part of the information processing job, when the group of the selected specific information processing apparatuses registered in the list implement the information processing job as a whole.

20. The information processing method of claim 19, wherein each of the specific information processing apparatuses to be included in the group is selected, based on an individual processing capability of each of the other information processing apparatuses and the initiating information processing apparatus.

21. The information processing method of claim 20, wherein an information processing apparatus, a processing capability of which is equal to or lower than a predetermined capability level, is excluded from the list.

22. The information processing method of claim 19, further comprising:

establishing plural groups, the ability differences between the groups being suppressed, and a processing order of the plural groups; and creating the list in which both the plural groups and the processing order are registered.

23. The information processing method of claim 21, wherein the plural groups are established, based on an individual processing capability of each of the other information processing apparatuses and the initiating information processing apparatus, in such a manner that differences between intensive processing capabilities of the plural groups are suppressed.

24. The information processing method of claim 22, wherein one of the specific information processing apparatuses is registered into the list as a host information processing apparatus, which accepts the information processing job requested by the client terminal device when the group takes a turn at implementing the information processing job in the processing order of the plural groups, and notifies the client terminal device of a message that the information processing job is to be conducted by sharing the information processing job among the information processing apparatuses included in the group in which the host information processing apparatus is included.

25. The information processing method of claim 24, wherein, after accepting the request of the information processing job, the host information processing apparatus updates the list by changing the list so that a next-host information processing apparatus, included in a next group ranked next to the group in the processing order, accepts the request of the information processing job, and transmits an updated list to information processing apparatuses registered in the updated list.

26. The information processing method of claim 19, wherein the list is recreated under a predetermined condition.

27. The information processing method of claim 26, wherein the predetermined condition is such that a final turn in a processing order registered in the list is finalized.

* * * * *